US007280042B2

(12) United States Patent
Trela

(10) Patent No.: US 7,280,042 B2
(45) Date of Patent: Oct. 9, 2007

(54) STANDOFF SECURITY AND REAL-TIME VENDOR VERIFICATION SYSTEM AND APPARATUS

(76) Inventor: Richard Steven Trela, 100 Pierce St. #1101, Clearwater, FL (US) 33756

( * ) Notice: Subject to any disclaimer, the term of this patent is extended or adjusted under 35 U.S.C. 154(b) by 99 days.

(21) Appl. No.: 11/087,923

(22) Filed: Mar. 23, 2005

(65) Prior Publication Data

US 2005/0219359 A1 Oct. 6, 2005

Related U.S. Application Data

(60) Provisional application No. 60/555,760, filed on Mar. 24, 2004.

(51) Int. Cl.
*G08B 1/08* (2006.01)
*H04Q 7/00* (2006.01)
(52) U.S. Cl. .................. 340/539.22; 340/937; 340/5.2; 348/156; 348/143
(58) Field of Classification Search ............ 340/539.22
See application file for complete search history.

(56) References Cited

U.S. PATENT DOCUMENTS

| 3,997,723 | A | * | 12/1976 | Sandin | ........................ | 348/343 |
| 4,581,634 | A | * | 4/1986 | Williams | ..................... | 348/156 |
| 4,821,118 | A | * | 4/1989 | Lafreniere | .................. | 348/156 |
| 5,550,359 | A | * | 8/1996 | Bennett | ........................ | 235/382 |
| 5,635,981 | A | * | 6/1997 | Ribacoff | ...................... | 348/156 |

(Continued)

*Primary Examiner*—Benjamin C. Lee
*Assistant Examiner*—Eric M. Blount

(57) ABSTRACT

A stand-off security checkpoint system and apparatus that enables security officers entrusted with protecting our nations' critical infrastructure or other high risk locations, a means of verifying in real-time, the identity of entrants to a facility. Via a communications system and apparatus that is positioned a safe, stand-off distance away from the entrance to a facility, a person entering a facility exits his vehicle or walks up to a machine housing which is equipped with cameras and sensor equipment. A close up view of the persons' identification as well a picture of the person himself is captured and readied for real-time transmission to security personnel well away from the entrants location at the machine. Via wireless transmitter and receiver equipment, and computer hardware and software arrangements incorporated into the system, the entrant and his identification card can be viewed and verified, from a safe standoff distance by on-site, as well as off-site security screening personnel. The utilization of wireless networks and internet communications networks, along with the machines' physical features and use, creates multiple opportunities to detect suspicious behavior by entrants to facility well before they reach an unsafe distance to the entrance. While in operation, and with the person a safe distance away from the entrance, the system further equipped with sensors to detect metal, chemical and biological substances can also send special alerts to the detection of harmful substances, well before the entrant reaches the entrance to the facility or security checkpoint. By design, the system and apparatus creates a new and effective means of deterring terrorists who may be trying to effect a terrorist infiltration by disguising themselves as officials or vendors. Additionally, the system is designed to be laid out so as to prompt a direct separation of a would-be suicide or truck bomber from his vehicle. This can greatly deter his desire to effect an attack at that location, as the chances for nullification and or the detection of suspicious activity by security officers operating the system, well before he reaches his location are greatly in odds against him.

10 Claims, 11 Drawing Sheets

U.S. PATENT DOCUMENTS

| | | |
|---|---|---|
| 6,658,091 B1 * | 12/2003 | Naidoo et al. ................ 379/37 |
| 6,917,902 B2 * | 7/2005 | Alexander .................. 702/189 |
| 6,952,163 B2 * | 10/2005 | Huey et al. ................. 340/521 |
| 2003/0206100 A1 * | 11/2003 | Richman et al. ............ 340/506 |
| 2004/0088584 A1 * | 5/2004 | Shachar et al. ............. 713/201 |
| 2004/0199785 A1 * | 10/2004 | Pederson .................... 713/200 |
| 2006/0010199 A1 * | 1/2006 | Brailean et al. ............ 709/204 |
| 2006/0028556 A1 * | 2/2006 | Bunn et al. ............ 348/211.99 |

* cited by examiner

STANDOFF SECURITY AND REAL-TIME VENDOR VERIFICATION SYSTEM AND APPARATUS

CROSS REFERENCE TO RELATED APPLICATIONS

This application is entitled to the benefit of Provisional Patent Application No. 60/555,760 Mar. 24, 2004

STATEMENT REGARDING FEDERALLY SPONSORED RESEARCH AND DEVELOPMENT

Not Applicable

BACKGROUND OF THE INVENTION

1. Field of the Invention

The present invention relates to the field of homeland security access control systems. More particularly, the present invention relates to a system and method of providing real-time identification verification of venders and other entrants into a facility via a series of steps calculated to detect and deter persons who may be trying to enter a facility under false premises. Furthermore, the system operates at a safe stand-off distance from the entrance and provides an effective means of detecting suicide and truck bombers, well before the reach an entrance to a facility.

2. Background of the Invention

After the terrorist attacks of September 11th, facilities of all types both public and private have had to increase security to prevent infiltration or further terrorist attacks, while still remaining open for the normal business traffic of both delivery persons, contractors, temporary employees or other such visitors. Tactics used by terrorists include entering a facility disguised as a vendor or an official, or to gain access by blending in with others who are known at an entrance, to escape notice. Accordingly, systems for spotting suspicious behavior and assisting security personnel to easily spot suspicious activity in persons entering facilities of all types, has become an extremely high priority in today's security world, wherein, terrorism determent has become a high priority in the U.S. as well as globally. Prior art references will be found to be limited as the present invention was born out of needs created in the U.S. after the September 11 attacks, for more stringent emphasis on positive I.D. access control with further emphasis on stand-off distance due to need to be alert to harmful chemicals or explosives on persons or vehicles entering a facility.

Supporting Documentation of Need

Department of Homeland Security (DHS) Information Bulletins are informational in nature and are designed to provide updates on the training, tactics, or strategies of terrorists. The following information is meant to update owners and operators of the nation's infrastructures about the possible use by terrorists of official identification, uniforms, or vehicles to gain access to sensitive facilities to carry out attacks. "Official" refers to recognized components of federal, state, and local governments and private sector entities. On Jul. 22, 2003, DHS released Information Bulletin "Potential Terrorist Use of Official Identification, Uniforms, or Vehicles."

DHS possesses no information indicating an organized effort by terrorists in the United States to illegally obtain official identification, uniforms, or vehicles in furtherance of terrorist activities. However, terrorists overseas have disguised vehicles and used emergency, police and other official vehicles in carrying out bombing attacks. They have also, in at least one case, disguised themselves as law enforcement officers to carry out an attack. We also continue to receive all-source reporting on the thefts of uniforms and ID cards, particularly in the aviation sector.

DHS and state and local law enforcement agencies on the Southwest border of the United States have noted a trend by drug and alien smugglers to use official vehicles to smuggle people or goods across the U.S. border. Attempts to acquire official identification, uniforms, or vehicles to facilitate attacks or smuggle personnel or weapons would be consistent with the tactics and techniques of al-Qaida and other extremist groups, according to a variety of reporting sources.

SUMMARY OF THE INVENTION

The present Invention describes a system, method and apparatus for the real-time identification verification of vendors and entrants entering a facility that enables security personnel to begin the identification verification process of the entrant from a safe standoff distance, at the beginning of the security inspection cycle. The present invention further describes a sequence of steps the entrant must follow which are calculated to induce suspicious reactions and responses from the entrant, that then can be easily noted by security personnel. Noted suspicious reactions then prompts further screening of the suspicious person entering a facility before he gets to close to an entrance or protected assets.

In a preferred embodiment, the present invention describes a machine equipped with a street level camera for taking real-time digital video images of a person entering a facility while at the same time, the persons' identification card is also captured in real-time digital video format by a second, strategically placed camera in positioned in an I.D. holder.

The images of both the person and his identification card are simultaneously transmitted either by wire, the Internet or other wireless means from the machine located a predetermined standoff distance from the onsite security review center or office. At the review office or center, the image is viewed on a video monitor by a security officer who can verify the identity of the person entering the facility while still at a safe standoff distance from the entrant.

The machine generated images are then made available for review by off-site security personnel of the entrants' company, via a secured internet connection and website designed for the real-time review and verification of the person entering the facility.

In addition, the machine can be battery operated and solar re-generated for use in areas not easily provided with electricity, but where it is still very vital to verify the identity of entrants well before they enter a facility, such as at the entrance to a dam, nuclear plant or military base. The unit being equipped for wireless use, can be strategically placed well away from the roadway. This creates a scenario wherein a terrorist with a vehicle loaded with explosives or wearing a suicide bomber belt would quite possibly abort his mission as his chances of being nullified before reaching his intended target are greatly increased. Further, being equipped so as to be portable, the present invention can be easily set-up for temporary use such as may be needed for tactical military security operations. Furthermore, the present invention can be equipped with metal detectors as well as with chemical and biological detectors designed to detect harmful substances on persons well before entering the facility and with additional circuitry and transmitters alert security personnel from a safe distance accordingly.

Advantages of the Invention

The overwhelming immediate acceptance by law enforcement agencies of the current invention has validated the fact that there has been a strong, long felt need for an efficient and convenient method to process personnel entering into high risk security checkpoints with greater regard to accuracy and attention to detail, as well as providing a way for law enforcement agencies to cooperate together to form a stronger, more organized effort in matters concerning handling terrorists threats against our homeland, by standardizing real-time entrance checkpoint personnel identification verification procedures. The current invention provides many new and unique advantages for law enforcement officials over earlier entrance screening procedures that were as varied as each location, and which were only as good as the observation capabilities, and training of the personnel doing the inspecting. A vast majority of our nations security checkpoints are vulnerable to penetration by terrorists on many levels. Many weaknesses exist currently at our nations' security checkpoints that the current invention helps to remedy. With the fact that human confront capabilities of terrorists and criminals varies widely between security individuals and can cause "look the other way" tendencies. This along with countless other problems related to personnel identification verification which are directly addressed and assisted by proper use of the present invention, makes this system a vital new invention for our nations' new security needs. Indeed, as will be seen in the following pages this invention creates many new and effective security procedures that can easily be utilized by security personnel who must confront today's terrorism risks on a daily basis.

The present invention allowing security personnel to provide security checkpoint steps and procedures that are calculated to induce suspicious reactions, it a new and valuable tool for law enforcement personnel charged with the security of our nations vital checkpoints. Criminals and terrorists are at a great disadvantage when confronted with real-time identity verification before reaching the checkpoint of a possible target of terrorist attack or infiltration. The current invention provides an advantage over earlier methods of screening personnel at security checkpoints by providing a means for security personnel to receive real-time registration images of persons entering a facility which creates a safe standoff distance between the entrant to the facility and the security guards themselves. Additionally, the current invention provides a means of alerting off-site law enforcement agencies to a security threat by having suspicious persons register at the real-time entrant verification machine and having off-site agencies run a match of the entrant's image and identification through photo image matching software and do a data base cross reference check against known terrorist watch lists and criminal photo logs. In instances where personnel are at risk due to suicide and vehicle bombers the present invention provides additional safety as the security officers can arrange a checkpoint stop at a safe standoff distance from himself and begin a suspicious activity analyses well away from the checkpoint or assets he is protecting. Another advantage that the present invention inherently provides is the ability to quickly train security personnel on procedures that drill and enhance observation skills on personnel so that they can be alert to suspicious reactions from persons using the present invention at a facility entrance in real-life. Another advantage to the system is that literacy skills vary amongst personnel and since the system is designed to communicate visual images for immediate review by other offsite personnel, language barriers are minimized by the use of a visual identification process. An additional advantage of the present invention is that weather problems such as wind blown sand, rain extreme cold, or other environmental factors that may inhibit proper document screening can now be reviewed from the comfort of a command center a safe stand-off distance away and out of the weather. The events of September 11 have also created the unforeseen need for insurance companies insuring against terrorism, to be able to document security diligence against fake identification infiltration and suicide bomber risk mitigation of properties they insure against. This invention answers this problem by providing a real-time verification of entrants entering secured facilities and providing, through digital image electronic storage, a large library of checkpoint screening actions by date and time, providing insurance companies complete digital logs of the real-time entrant verification of persons entering high risk areas. That, combined with the stand-off capability the present invention provides helps greatly to reduce the risk of a suicide attack at that particular facility or checkpoint.

BRIEF DESCRIPTION OF THE DRAWINGS

The present invention will be understood and appreciated more fully from the following detailed description, taken in conjunction with the drawings in which.

DETAILED DESCRIPTION OF THE PREFERRED EMBODIMENTS

Figure 1:
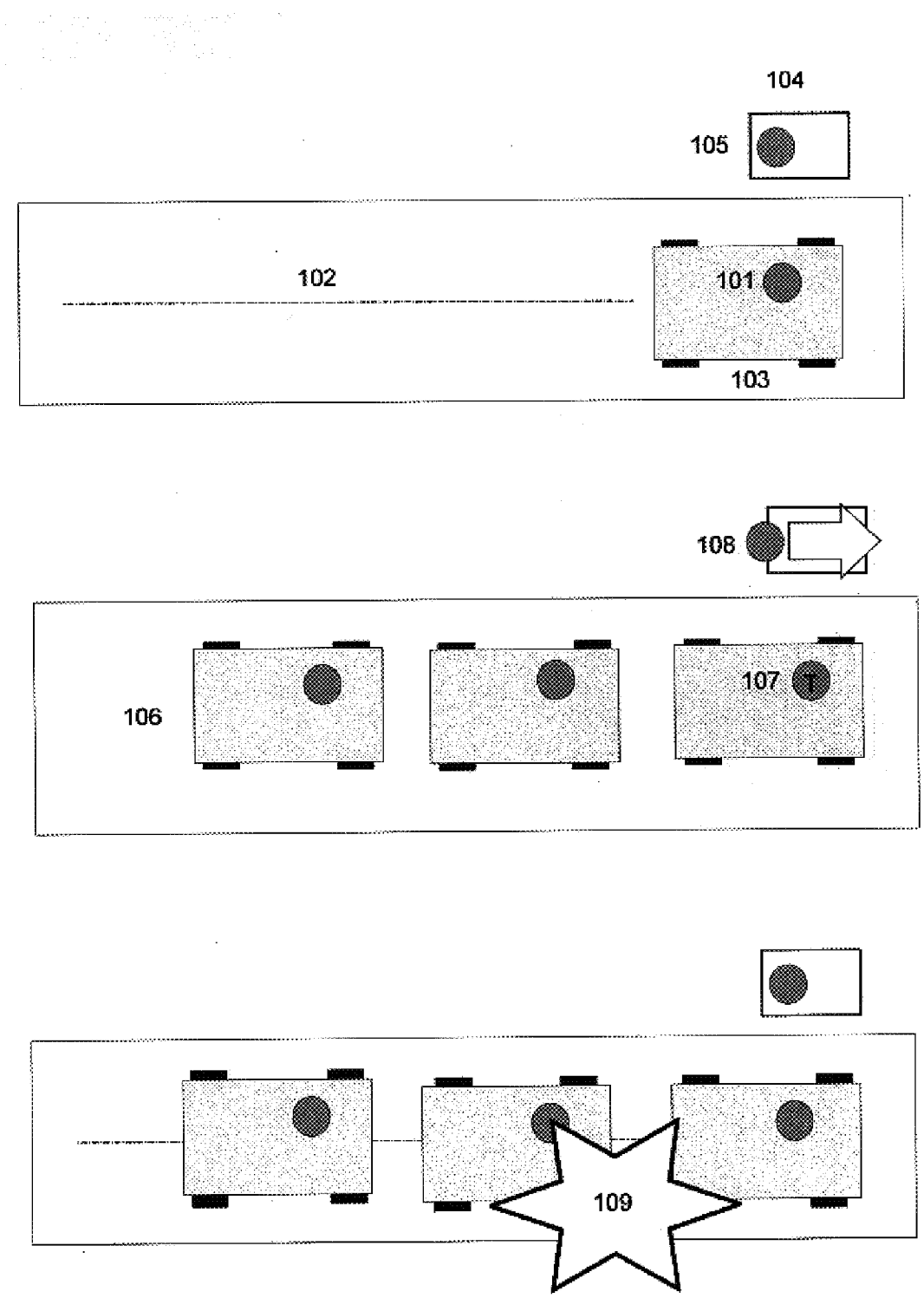
FIG. 1 is a block diagram illustrating the typical layout and traffic scenarios of entrants driving motor vehicles into a facility.

Reference is now made to FIG. 1, which is a block diagram illustrating the typical sequence of an entrant to a facility or a security check point. As shown, an entrant 101 typically drives 102 his or her car 103 up to a facility entrance guard post or a security checkpoint post 104. Once at entrance or checkpoint 104 the entrant must usually wait in line to have his identity checked with security personnel 105 at the checkpoint. The amount of vehicles gathering at a checkpoint can greatly affect the safety of security personnel as well as assets close to an entrance. For example, large amounts of cars lined up at an entrance 106 can create an opportunity for terrorist infiltration 107 based on the haste of a security guard to expedite 108 entrance screening due to the back-up of cars or a suicide bomber may find a large enough target to detonate his explosives 109.

Figure 2:
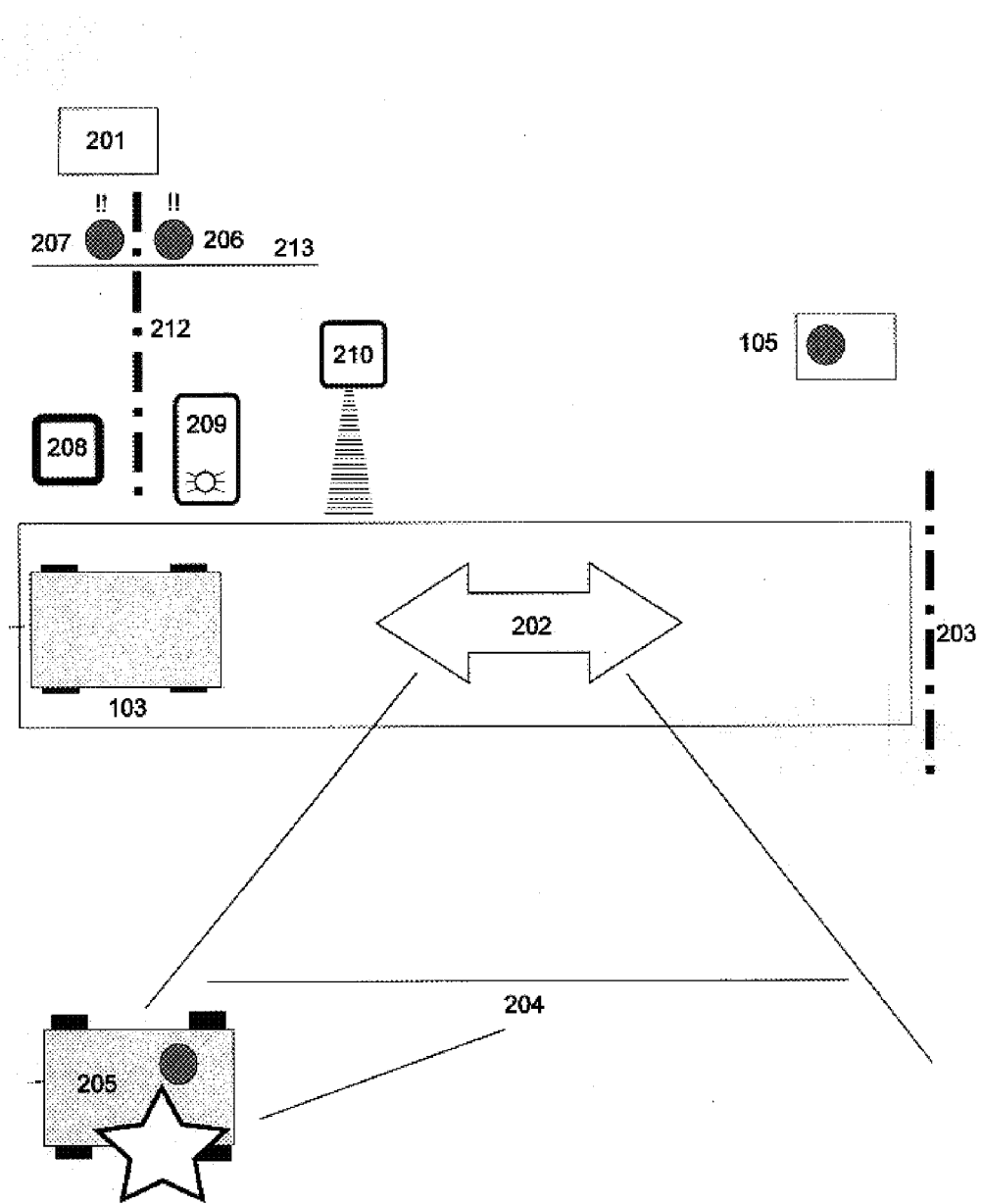
FIG. 2 is a block diagram illustrating the traffic flow entering a facility according to the present invention.

Reference is now made to FIG. 2 which is a block diagram illustrating the traffic flow entering a facility according to the present invention wherein the vendor and entrant verification apparatus unit 201 is positioned at a safe stand-off distance 202 from the normal entrance 203 according to a calculation of explosive cargo potential 204 of the vehicle types 205 entering a facility. Vehicle drivers 206 and occupants 207 entering the facility are directed to stop adjacent the entrant verification unit 201 by a sign 208 or an audio announcement 209 or a localized radio broadcast 210 to walk a distance 212 away from their vehicle far enough to cause concern 213 for a suicide or truck bomber as his operation may be thwarted by his separation well away from his vehicle and well away from the entrance to the facility or intended attack target.

Figure 3:
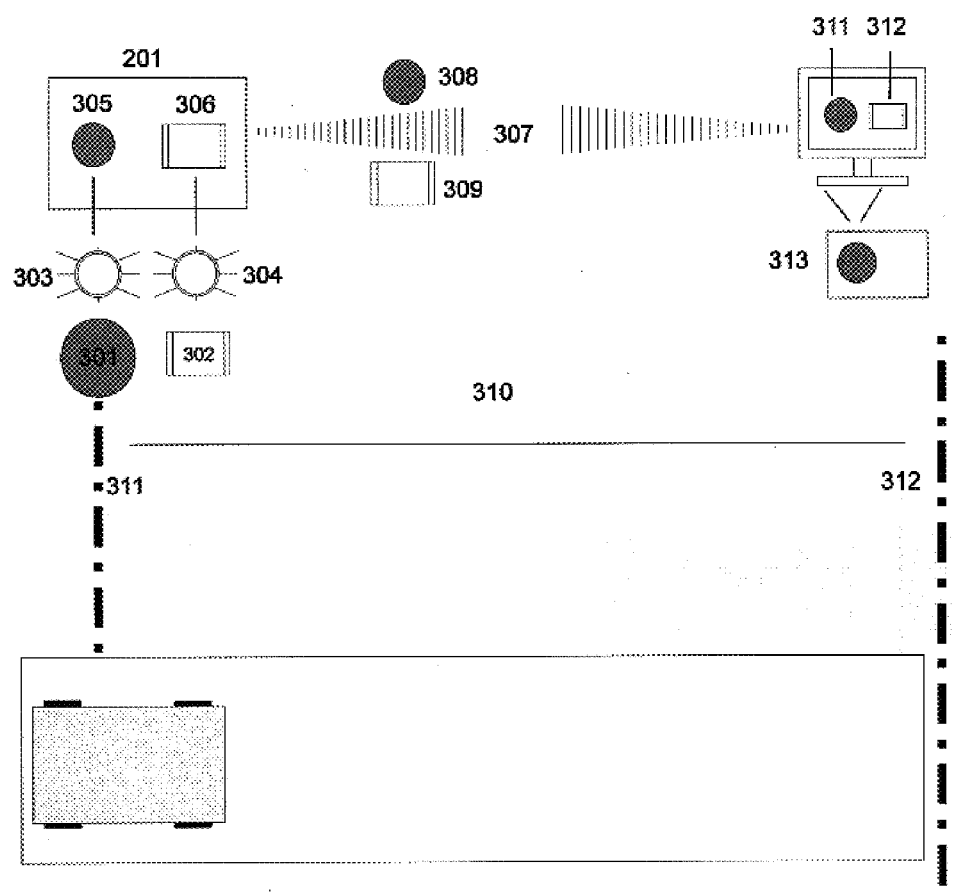
FIG. 3 is a block diagram illustrating the present inventions' sequence of actions an entrant goes through in a real-time entry identification verification process.

Reference is now made to FIG. 3 which is a diagram illustrating the present inventions' sequence of actions an entrant goes through in the real-time entry identification verification process. The entrant first stands in front of the digital camera 303 and then places his identification card or drivers license 302 in front of camera 304. Real-time digital images of the entrant 305 and real-time images of the entrants' identification card or drivers license 306 become wireless images 308 and 309 as they are transmitted via microwave frequency 307 across the standoff distance 310 from the entrant in front of the machine point to the normal entry point of the security guard or the normal entrance point for the facility 312. Security guard 314 views real-time images 311 of the entrant and real-time images of the identification or the drivers license 312 at monitor 313.

Figure 4:
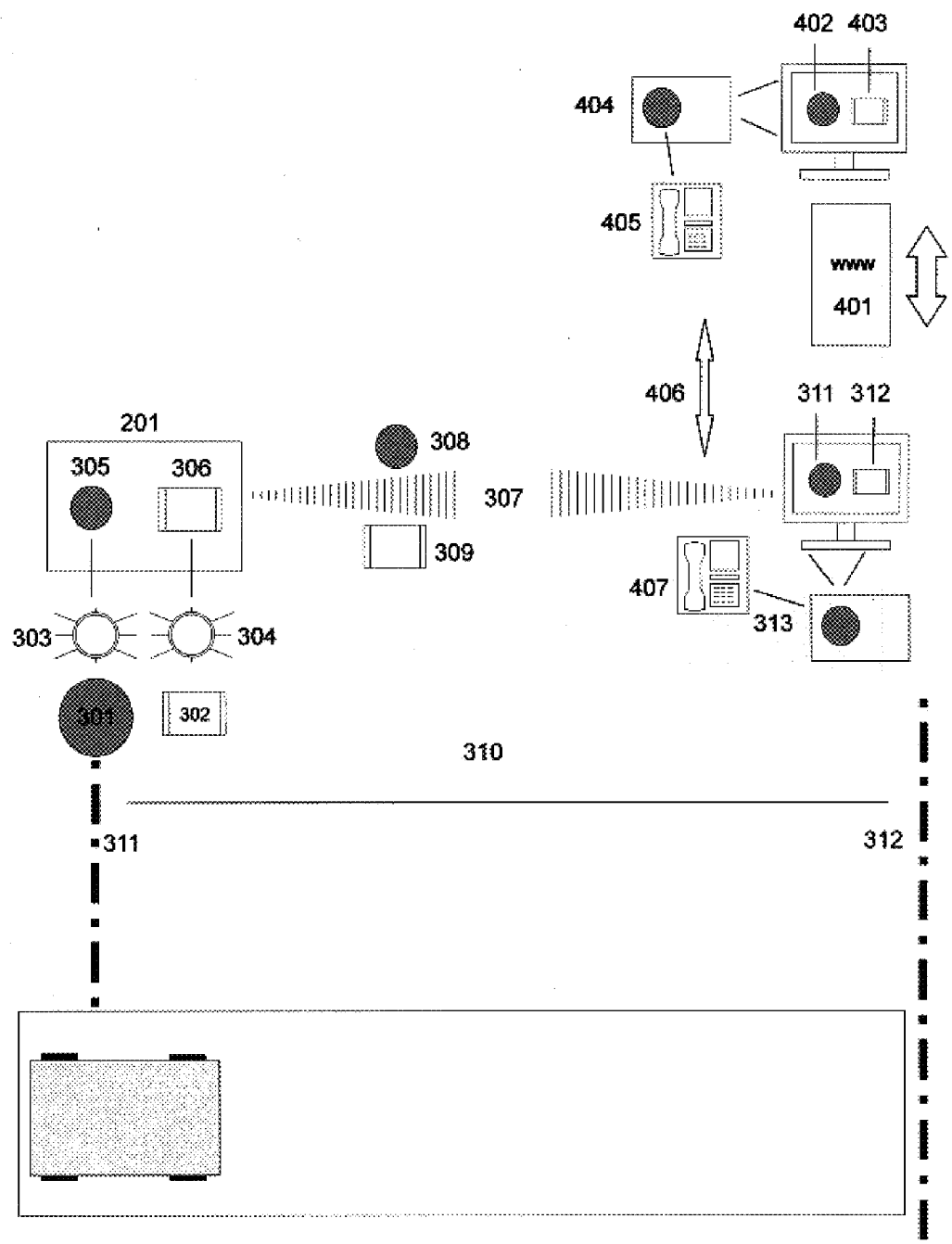
FIG. 4 is a flowchart illustrating the steps in a preferred embodiment of the present invention.

Reference is now made to FIG. 4 which is an extension of the FIG. 3 block diagram that further illustrates the present inventions' use in real-time entrant verification utilizing the internet 401 as a medium for connectivity to offsite entrant identity verification personnel 404. 402 illustrates the real-time images of the entrant 301 out side the facility entrance 312 a safe standoff distance 310 and 403 illustrates the real-time view of the entrants identification card or drivers license being presented for review at the vender and entrant verification unit 201 in front of camera 304 at a safe stand-off distance from the entrance at 311. The diagram further illustrates the two-way communication by telephone between entrant verification personnel at 404 speaking 405 to onsite security personnel 313 on a phone 407 conversation 406 about images 402 and 403 the verify the entrants' 301 identity in real-time.

Figure 5:
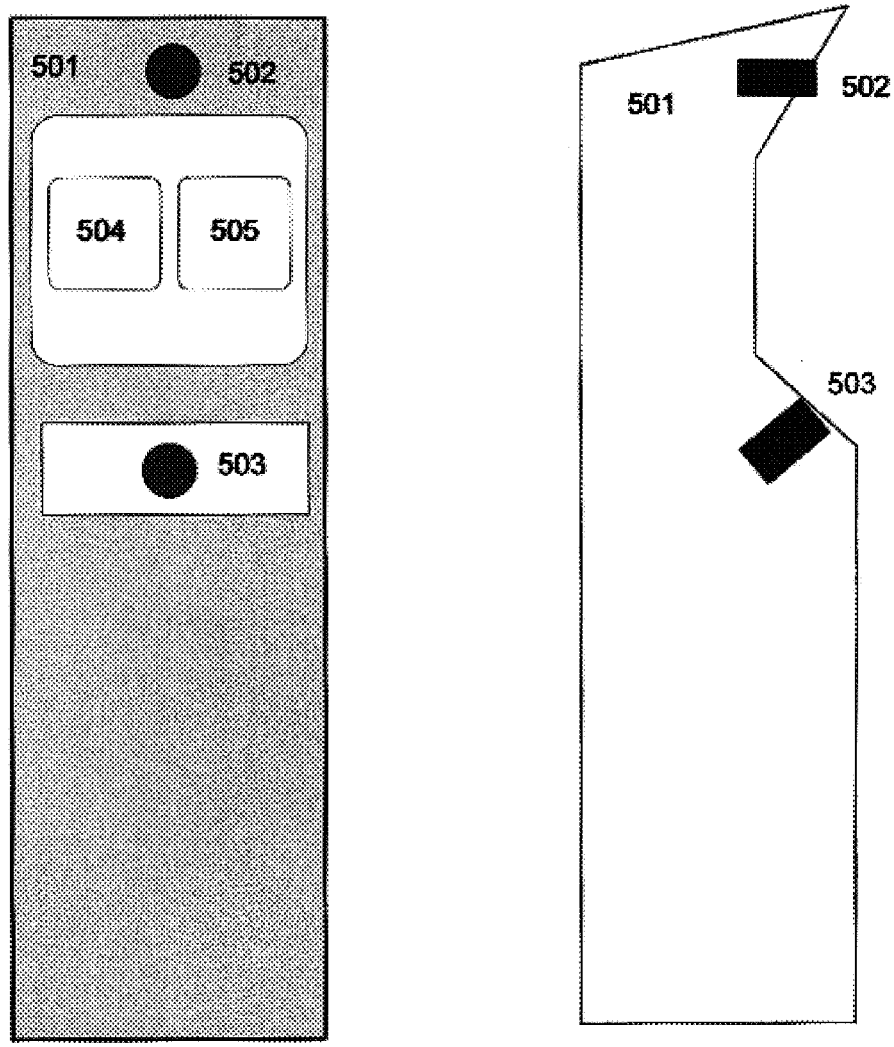
FIG. 5 is a diagram which illustrates the present inventions' preferred embodiment housing and external features.

Reference is now made to FIG. 5 which illustrates the present inventions preferred embodiment housing and external features. The external housing 501 supports the entrant digital image camera (a typical bullet CCD low voltage mini camera) 502 and the identification or drivers license digital image camera (a typical bullet CCD low voltage mini camera) 503 at heights and access levels appropriate to use by the general public. The reference screen 504 shows the user his picture is in frame and the reference screen 505 shows the user the identification or drivers license is in frame as well.

Figure 6:
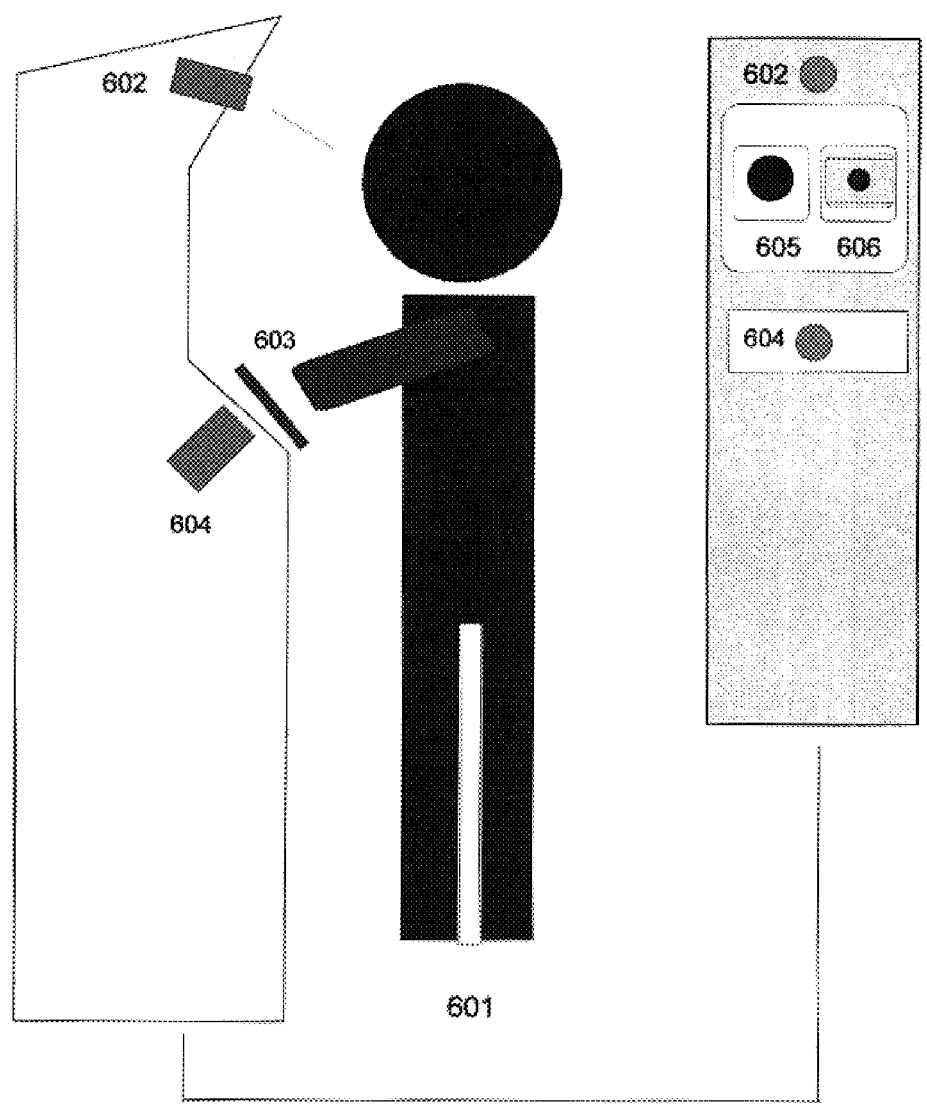
FIG. 6 is a diagram which illustrates the present invention as it would be used by an entrant to a facility.

Reference is now made to FIG. 6 which illustrates the present invention as it would be used by an entrant 601 to a facility. The entrant moves in front of live digital image camera 602 and places his identification or drivers license 603 in front of the live identification digital image camera 604. The image of 603 the identification card or drivers license appears in live reference screen 606 and the entrants' image shows up in the live reference screen 605.

Figure 7:
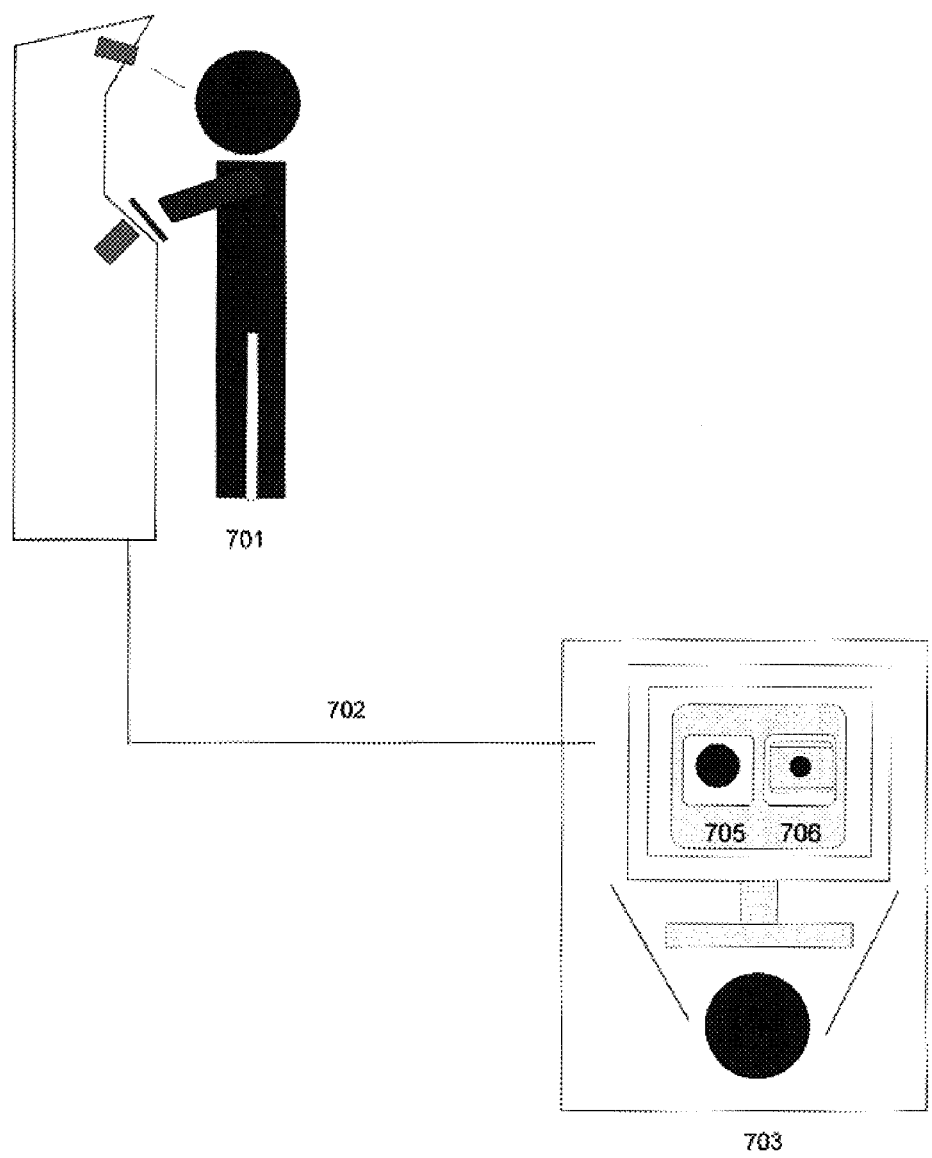
FIG. 7 is a diagram which illustrates the present invention in use wherein the entrant is at a safe standoff distance from an on-site security officer who is reviewing in real-time, the entrant on a remote viewer screen.

Reference is now made to FIG. 7 which illustrates the present invention in use wherein the entrant using the present invention 701 at a standoff distance 702 from on-site security officer 703 who is reviewing in real-time the entrant on a remote viewer screen 705 as well as reviewing the entrants identification or drivers license on remote viewer screen 706.

Figure 8:
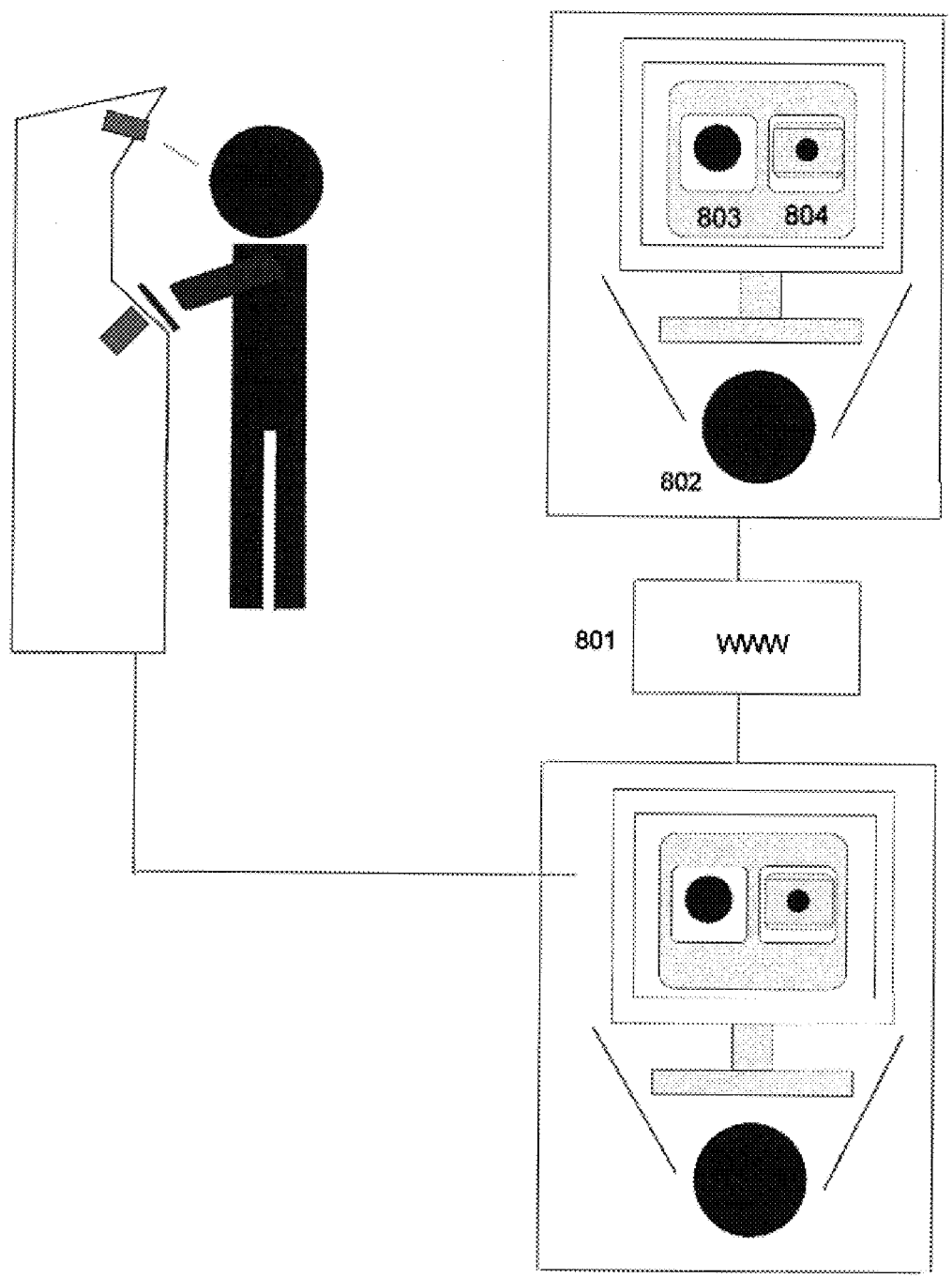
FIG. 8 is a diagram which illustrates how off-site entrant verification personnel, can view the entrant in real-time on a remote viewer screen, and view the entrants identification card in real-time on a remote viewer screen via an internet connection.

Reference is now made to FIG. 8 which illustrates how off-site entrant verification personnel 802 can view the entrant in real-time on a remote viewer screen 803 and view the entrants identification card in real-time on a remote viewer screen 804 via an internet connection 801.

Figure 9:
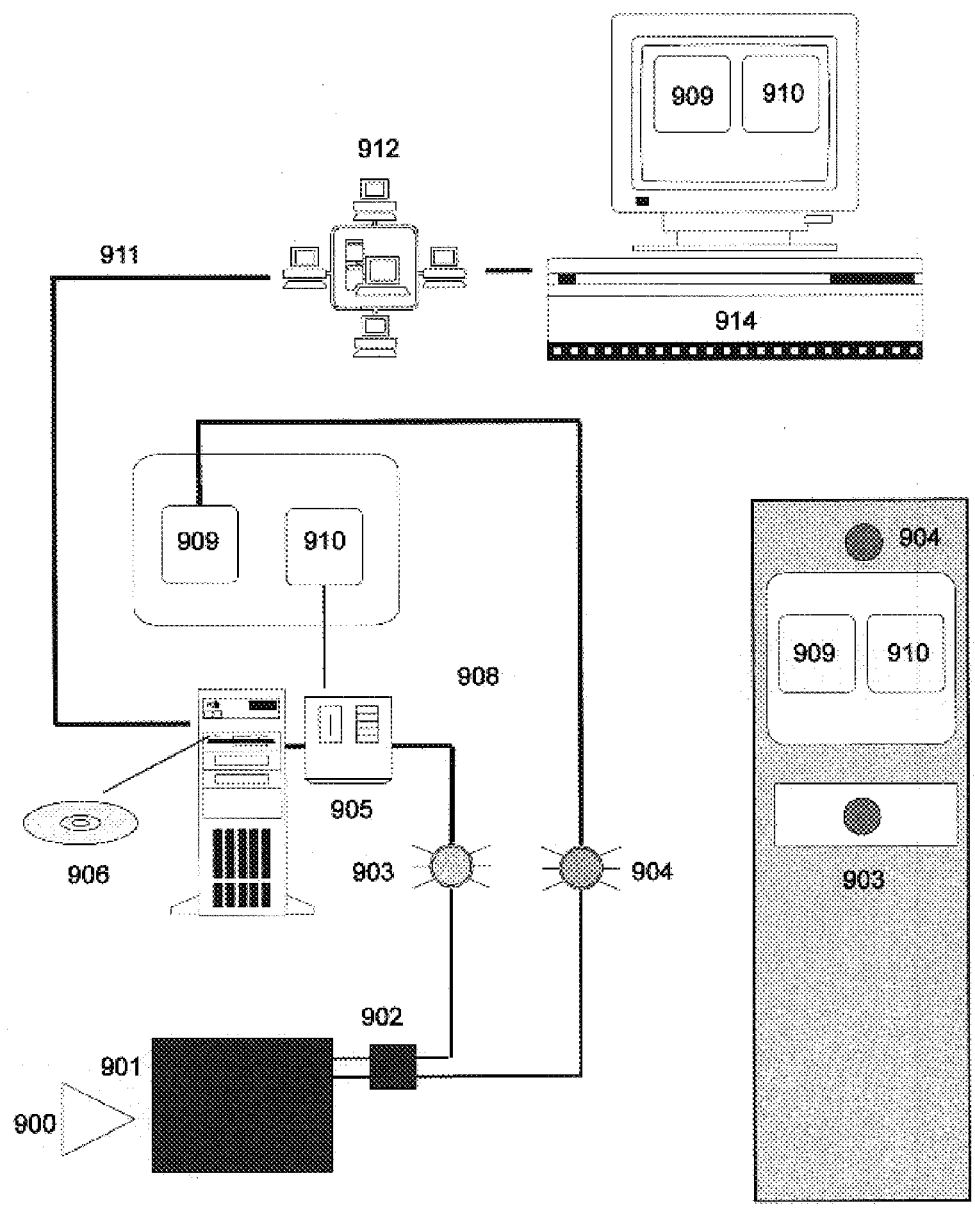
FIG. 9 is a block diagram illustrating the present inventions' electronic components and interconnectivity.

Reference is now made to FIG. 9 which illustrates the components of the present invention in block diagram and symbol form. Power is drawn from the mains and converted to a usable power voltage via a transformer 901 and delivered to a conventional computer and processor 905. The power is also converted via a transformer 902 to operate cameras 903 and 904. In operation camera images created by cameras 903 and 904 are input into CPU 905 via a digital video server card (Geo-vision 600 or equivalent) 908 capable of MPEG 4 compression and further capable of interoperation with software 906 (GV 600 camera and internet server software or equivalent) which is designed to create a secured web server source for remote view of images created by camera 903 and 904. The illustration further shows local views of cameras 903 and 904 on viewing screen 909. An internet connection line 910 illustrates the internet connection for remote viewing of cameras 903 and 904 via the WWW symbol 911.

Figure 10:
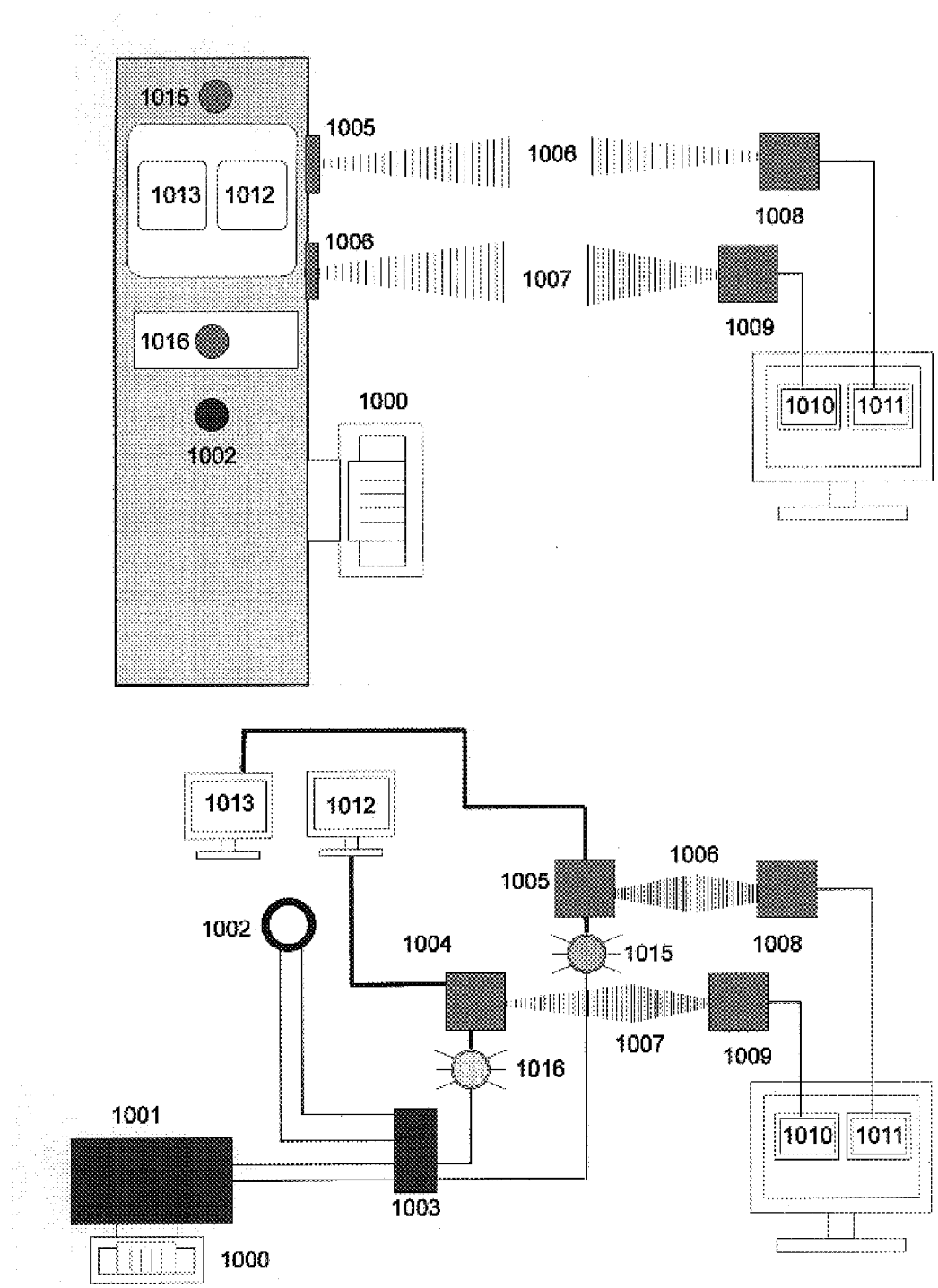
FIG. 10 is a diagram which illustrates a design wherein the present invention can be made portable and suitable for rough climates or locations with on-site electrical power.

Reference is now made to FIG. 10 which illustrates a design wherein the present invention can be made portable and suitable for rough climates. The diagram illustrates a solar panel 100 matched to supply recharging current to a battery power supply 1001 of 12-24 volts switched to the rest of the circuit via a standard watchdog motion event triggered relay 1003 which is activated by an entrant to a facility as he approaches the present invention housing via an installed proximity sensor 1002 that activates at a range between 3 and 15 feet from the present invention housing 501. Camera images are then transmitted 1006 and 1007 by low voltage wireless transmitters (for example HP12-200TX) 1004 and 1005 which generally operate between 900 mghz and 5.8 ghz, to the matching receivers at 1008 and 1009 which receive the signals and generate an image at viewing screens 1010 and 1011. The battery can be solar regenerated 1000 and the use of power can be greatly limited by power activation to the transmitters and cameras only while an entrant to the facility is in proximity to and operating the present invention.

Figure 11:
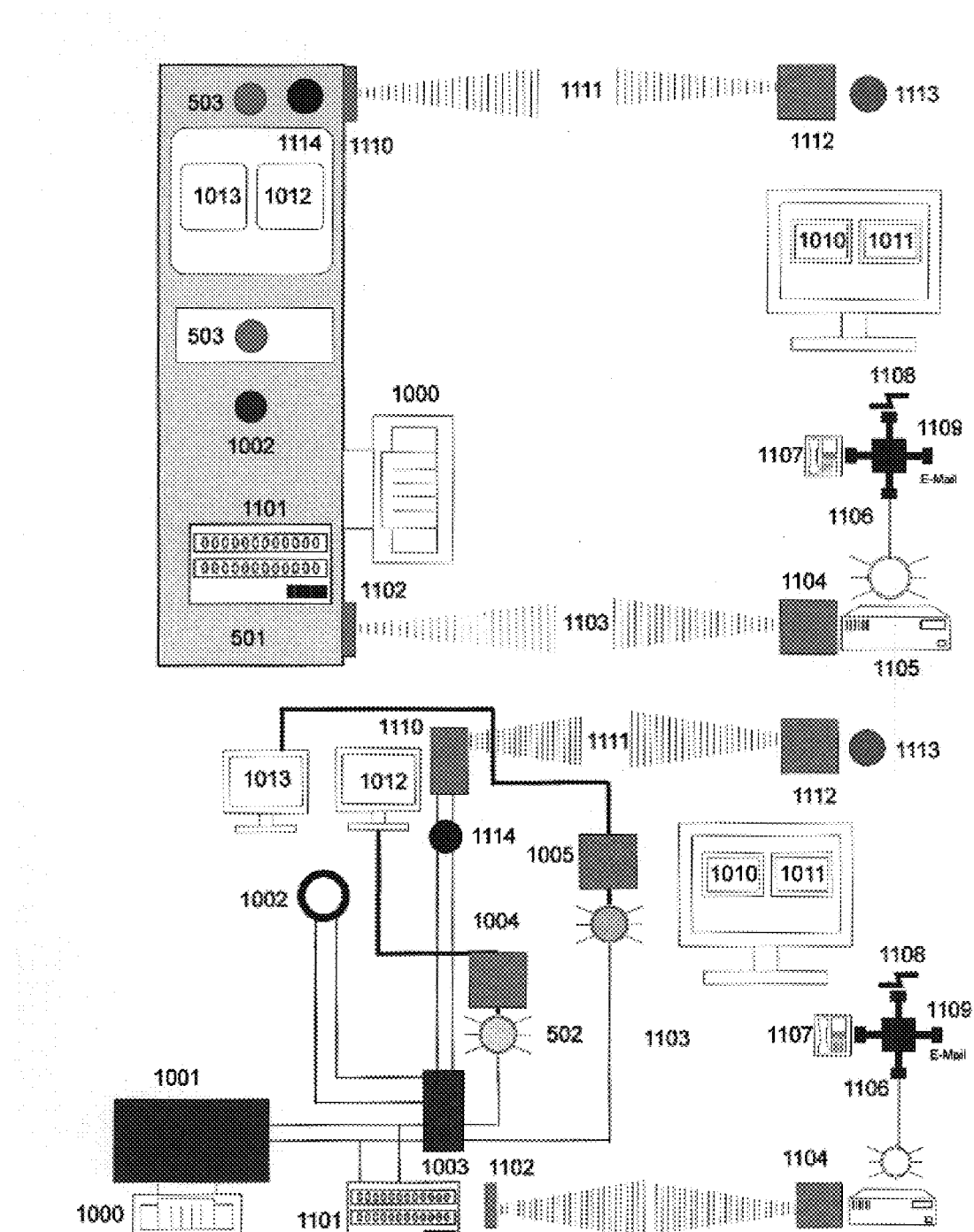
FIG. 11 shows the system equipped for biological, chemical and metal detection as well as being equipped with a two way communications system for communication between the entrant and the security post.

Reference is now made to FIG. 11 which shows the system equipped for biological, chemical and metal detection 1101 as well as being equipped with a two-way communications system 1111 for communication between the entrant and the security post. Power is supplied to the biological, chemical and metal detection panel 1101 by power supply 1001 in battery form as well as by 901 as shown in FIG. 9. detection triggers relay transmitter 1102 which is a standard extended range transmitter (XT-1 Linear) that is received by it's matching receiver (XT-1 Receiver Linear) which activates an automatic communication CPU or sole purpose unit 1106 designed to initiate 1107 phone calls, pager alerts 1108 or e-mail alerts as well as trigger an alert at a local alert box 1105 designed to sound an alarm when a detection is originated through the system form 1101. Additionally a two-way communications system is shown 1111 which (standard FM intercom system) transmits two way-communications via transceiver 1110 and transceiver 1112 and is heard and spoken on by the entrant on speaker/microphone 1114 and is heard and spoken on by the security officer on transceiver 1113.

FIGS. 10 and 11 show the entire system and housing that would enable a person skilled in the art to make and use the invention without extensive experimentation.

While the present invention has been described with reference to the preferred embodiments, those skilled in the art will recognize that numerous variations and modifications may be made without departing from the scope of the present invention. Accordingly, it should be clearly understood that the embodiments of the invention described above are not intended as limitations on the scope of the invention, which is defined only by the following claims.

The invention claimed is:

1. A digital image and computer-based standoff security checkpoint system and apparatus for deterring vehicle and suicide bomber attacks by initiating a process and system of security checkpoint steps an entrant to a facility goes through from a standoff distance away from security personnel that verifies an entrants' identity in real-time at a facility entrance comprising:

a machine housing that serves as a base station for the gathering and simultaneous transmission of real-time images of an entrant to a facility as well as said entrant's drivers license or other I.D. card;

a digital camera positioned at the top of said machine housing positioned to visually capture the face image of an entrant to a facility to transmit via conventional image transmission means including but not limited to cable, hard wired Internet, wireless Internet, microwave transmission and receiving systems, cellular signal or satellite transmission accurate images of an entrant to a facility as well as a separate digital camera positioned at the center of said machine housing positioned to visually capture and transmit via conventional image transmission means including but not limited to cable, hard wired Internet, wireless Internet, microwave transmission and receiving systems, cellular signal or satellite transmission accurate images of an entrants' identification card or drivers license upon an entrants approach to a facility;

a server computer including a processor for maintaining digital image gathering software and a video card system for generating LAN and WAN Web site accessible communications;

a digital image database designed for storing digital images of an entrants' face and digital images of an entrants' identification card or drivers license including the date and time information of an entrants access to the facility;

a web based hyperlink for accessing real-time visual information from an entrants' use of said machine housing which allows real-time viewing of the entrants' I.D. as well as a real-time viewing of an entrants face over the Internet;

a web based hyperlink for accessing real-time visual information from an entrants' use which allows real-time viewing of the entrants' I.D. as well as a real-time viewing of his face over a local area network;

a wireless video transmission for providing information to on-site security personnel, wherein the provided information comprises a real-time digital video image of the user as well as real-time digital image of an entrants' identification card or drivers license for the purpose of identifying the true identity of an entrant entering a facility in real-time while keeping an entrant at a safe stand-off distance;

a local wireless transmission receiver that allows the real-time verification of an entrants' identification card or drivers license as well as an entrant while maintaining a safe stand off distance from the entrant; and a local wireless two-way radio communication system that allows communication between the user and the security guard at a sate standoff distance away.

2. The system of claim 1, wherein the communications network is any conventional image transmission means including but not limited to cable, bard wired Internet, wireless Internet, microwave transmission and receiving systems, cellular signal or satellite transmission.

3. The system of claim 1, wherein the viewing Web site is configured to receive a digital image of an entrant to a facility as well as said entrant's identification or drivers license that is originated and generated by said digital cameras system positioned in said machine housing best suited to take a digital image of the facility entrant while simultaneously creating a digital image of his identification or drivers license for on-site review via a LAN and computer terminal as well as an off-site review and verification via the Internet before an entrant is permitted by security personnel to proceed past a safe stand-off distance from the facilities' assets upon entry to a facility.

4. The system of claim 1, wherein said housing supports a digital camera positioned to transmit images of an entrant to a facility as well a separate digital camera positioned to transmit images of an entrants' identification card or drivers license upon an entrants' approach to a facility, wherein the said housing is placed at a pre-determined safe stand-off distance calculated to create a buffer between an entrant and the assets of a facility based on the quantity of explosives or other harmful substances the type of vehicle an entrant is driving may house.

5. The system of claim 1, wherein the said communications system and housing is located at a distance from an entrants' vehicle so as to cause an entrant to separate far enough away from his vehicle so as to render him less certain of his suicide success as he moves farther and farther away from his suicide vehicle.

6. The system of claim 1 further comprising a housing equipped with biological sensors that detect harmful biological agents and set off an alarm back at security post located a safe stand-off distance away from assets and people.

7. The system of claim 1 further comprising a housing equipped with chemical sensors that detect harmful chemical agents and set off an alarm back at a security post located a safe stand-off distance away assets and people.

8. The system of claim 1 further comprising a housing equipped with metal detector sensors that detect large amounts of metal indicating a suicide bomber pack or other weapon and set off an alarm back at a security post located a safe stand-off distance away from assets and people.

9. The system of claim 1 further comprising at least one of a computer, a cellular telephone, kiosks, a PDA, or other remote computing device linked to the server via the communications link to verify in real-time the identity of an entrant to the facility.

10. The system as in one of claims 6-8 further comprising at least one of a computer, a cellular telephone, kiosks, a PDA, or other remote computing device linked to the server via the communications link to receive alerts from biological, chemical or metal detection sensors located in the said housing.

* * * * *